Jan. 14, 1964      K. ZWICK      3,117,495
DUPLICATING MACHINE WITH ROUGHING TOOL
Filed Feb. 15, 1962      5 Sheets-Sheet 1

INVENTOR
KURT ZWICK
BY Rupert J. Brady
ATTORNEY

Jan. 14, 1964 K. ZWICK 3,117,495
DUPLICATING MACHINE WITH ROUGHING TOOL
Filed Feb. 15, 1962 5 Sheets-Sheet 3

INVENTOR
KURT ZWICK
BY Rupert J. Brady
ATTORNEY

Jan. 14, 1964      K. ZWICK      3,117,495
DUPLICATING MACHINE WITH ROUGHING TOOL
Filed Feb. 15, 1962      5 Sheets-Sheet 5

INVENTOR
KURT ZWICK
BY *Rupert J. Brady*
ATTORNEY

United States Patent Office 3,117,495
Patented Jan. 14, 1964

3,117,495
DUPLICATING MACHINE WITH ROUGHING TOOL
Kurt Zwick, Munich, Germany, assignor to Hans Deckel, Munich, Germany, and Friedrich Wilhelm Deckel, Zug, Switzerland
Filed Feb. 15, 1962, Ser. No. 173,555
Claims priority, application Germany Feb. 21, 1961
12 Claims. (Cl. 90—13.1)

The invention is directed to a duplicating machine, particularly a duplicating milling machine of the type which is provided with a fine working tool carried by a parallelogram linkage system and controlled by a model or pattern, and more particularly the invention is directed to a roughing tool arrangement for such machine which is independent of the parallelogram linkage system.

In order to be able to provide the necessary relative motion between the roughing tool and the workpiece in a duplicating machine, the roughing tool must be arranged or supported independent of the work support. For reasons of stability it is not advisable to arrange the roughing tool, which operates with much higher cutting powers, on the parallelogram linkage system, for example, instead of the fine working tool. In known machines of this type, in the prior art, the tool head carrying the roughing tool has therefore heretofore been detachably secured on the machine part carrying the parallelogram linkage system to insure the full movability of the fine working tool, and to obtain the necessary stability for the roughing tool.

In contrast to fine working operation in the duplicating process where the tool, supported on the parallelogram, is moved relative to the fixed workpiece, the workpiece must be moved relative to the roughing tool in roughworking operations. This means, however, that the work support must not only have the low or minimum movability qualities necessary up to now for setting the workpiece, model and tool, but a movability corresponding to the maximum working range. In addition to the undesirable large dimensions of the machines required to provide movability corresponding to the maximum working range, and the resulting greater weight of these machines, the great distance which the operator of the machine must keep from the working surface in an unfavorable position to the work support for observation purposes is also a great disadvantage.

The above problem is solved by providing the roughing tool to be moved from a rest position outside the range covered by the parallelogram system into at least two operating positions. In a specially advantageous embodiment of the invention the roughing tool can be moved into two coordinate directions parallel to the clamping surfaces of the workpiece.

It is therefore an object of the present invention to provide a construction of duplicating machine of the type wherein the workpiece is moved relative to the roughing tool which keeps the movability of the work support as low as possible, while at the same time maintaining the full working range of the machine.

Another object of the invention is to provide a construction of duplicating machine of the type wherein the workpiece is moved relative to the roughing tool which provides the operator with a closer and more favorable vantage point for viewing the working surface.

Still another object of the invention is to provide a construction of duplicating machine of the type described in which the size and weight of the machine are greatly reduced relative to conventional machines for handling comparable size work, while at the same time maintaining full working range of the machine.

A further object of the invention is to provide a construction of duplicating machine of the type wherein the workpiece is moved relative to the roughing tool in which the roughing tool mechanism is adjustable to maintain work support movability at a minimum.

Other and further objects and features of the invention are set forth more fully in the specification hereinafter following by reference to the accompanying drawings, in which.

Figure 1:
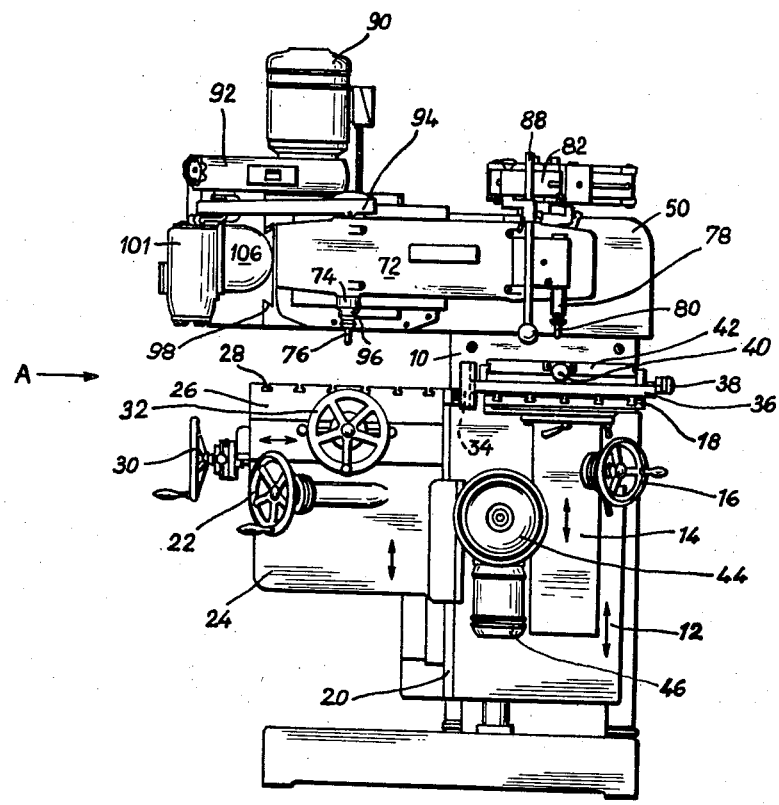
FIGURE 1 is a front elevational view of the duplicating milling machine of the invention, showing the roughing tool in the position of non-use.
Figure 2:
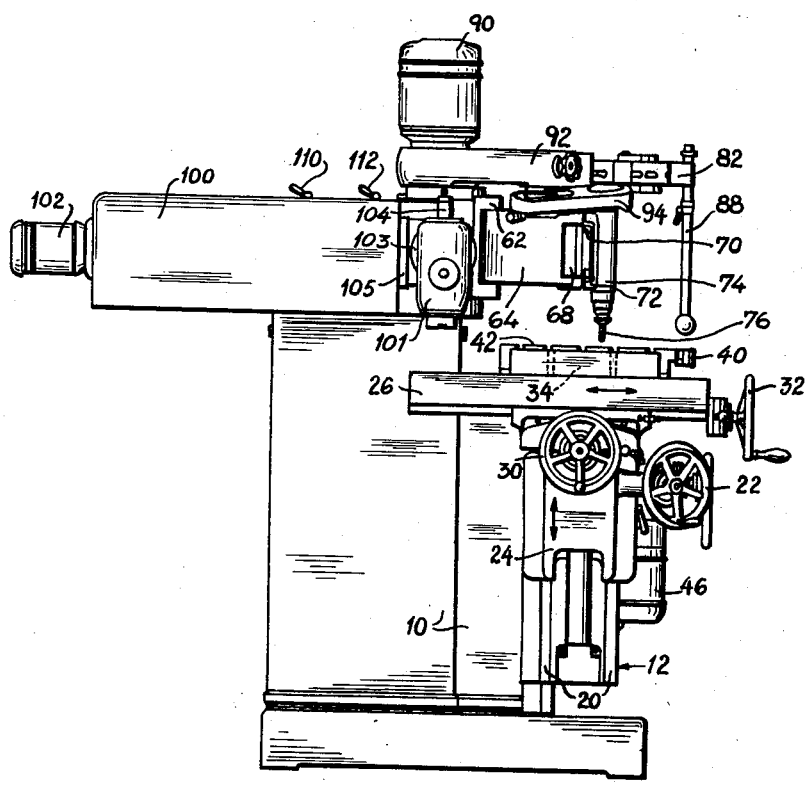
FIG. 2 is a side elevational view of the machine, looking in the direction of arrow A in FIG. 1.
Figure 3:
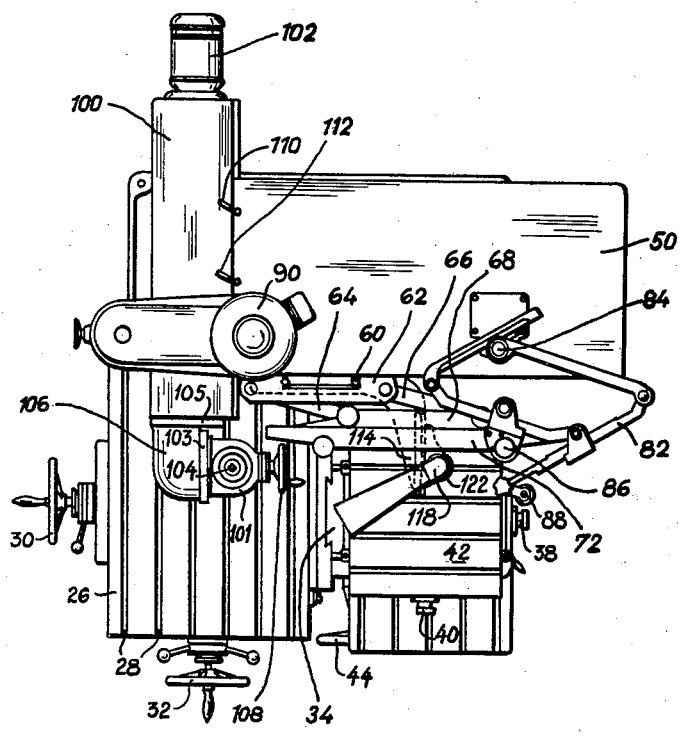
FIG. 3 is a top plan view of the machine of the invention and particularly showing the roughing tool in operating position, and the pantograph and parallelogram systems moved to a non-use position.
Figure 4:
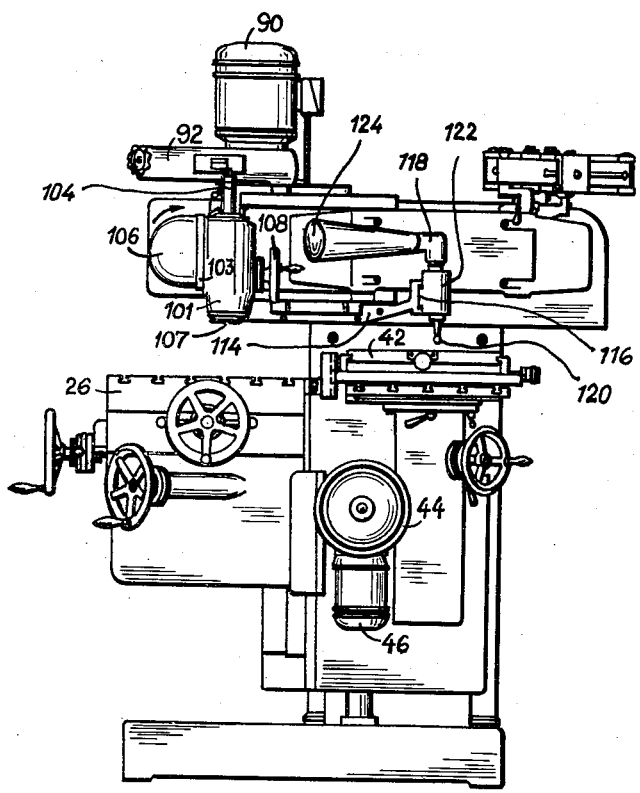
Figure 5:
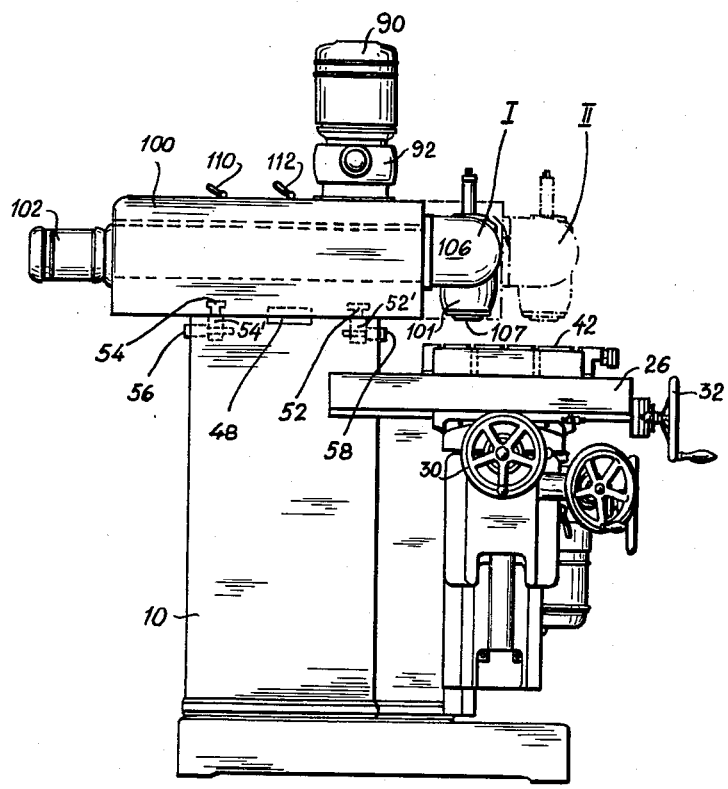

FIG. 4 is a front elevational view of the machine similar to FIG. 1, but showing the machine in the operating position represented in FIG. 3; and FIG. 5 is a side elevational view of the machine, similar to FIG. 2, but with parts omitted for purposes of clearer illustration and particularly showing the roughing tool in one of its operating positions in full lines, and in its other operating position in phantom.

Referring particularly to FIG. 1, reference numeral 10 represents a stationary machine stand to which intermediate bracket 12 is secured by means of vertical guide members (not represented) in conventional manner, the intermediate bracket being disposed to be moved vertically on said guides with respect to the machine stand 10. An adjustable model bracket member 14 is connected, in a similar conventional manner, to guides (not represented) connected on the intermediate bracket 12 with the bracket 14 being shiftable vertically in the guides with respect to bracket 12 by means of hand wheel 16. Model bracket 14 is terminated at its upper end by means of a clamping surface 18 connected thereto. In addition, vertical guides 20 are provided on one side of intermediate bracket member 12 as shown in FIGS. 1 and 2, and knee bracket member 24 is secured thereto and is vertically shiftable thereon with respect to intermediate bracket 12 by means of hand wheel 22. A worktable 26 having work-clamping grooves 28 on the surface thereof is connected in conventional manner to the top of knee bracket 24 and is arranged so that it can be moved horizontally in two coordinate directions by means of hand wheels 30 and 32, respectively.

A model or pattern clamping plate 42, which can be adjusted in the same two coordinate directions as the worktable 26, by means of adjusting screws 38 and 40, is connected in vertically movable relation relative to the worktable 26 and is rigidly connected for horizontal movement with worktable 26 in the two coordinate directions by means of coupling 34 as more particularly indicated in FIGS. 1–3. In order to move the worktable 26 and the model-clamping plate 42 vertically at the same time, the intermediate bracket 12 is vertically shifted by means of hand wheel 44 or the hoisting motor 46 which is disposed to automatically shift bracket 12 vertically with respect to the stationary machine stand 10.

Horizontal guides 48 are provided on the top surface of machine stand 10 as particularly shown in FIG. 5, and a cantilever member 50 is connected in conventional manner for horizontal movement in said guides with respect to the machine stand. Cantilever member 50 is provided on its underside with a pair of grooves 52 and 54, which are engaged by slotted cantilever screws 52' and 54', respectively, which in turn are selectively actuated by eccentric screw members 56 and 58 to lock the cantilever member 50 in a desired selected position on the machine stand.

A supporting plate 62, as shown particularly in FIG.

3, is connected in a vertical taper rolling guide 60 on the cantilever member, in conventional manner, so that the supporting plate is disposed in movable guided relation with respect to the cantilever member. Parallelogram mechanism guide rods 64 and 66 are pivotally connected on one end thereof to the supporting plate 62 and are respectively pivotally connected on the other end thereof to an intermediate linkage member 68, such that the guide rods 64 and 66 serve as a parallel guide for intermediate linkage member 68. A horizontal guide 70 is provided on the face of intermediate linkage member 68, in conventional manner, as shown in FIG. 2, and a shiftable beam 72 is displaceably mounted on the horizontal guide 70 with beam 72 being arranged to carry a mount 74 adjacent one end thereof for the fine working tool 76, and a mount 78 adjacent the opposite end thereof for a model tracer point or stylus 80. The tracer point 80 and the beam 72 are simultaneously moved as a unit by means of a pantograph of conventional design, generally indicated at 82, which is movably and pivotally mounted at 84 to the cantilever member 50 and whose tracking point 86 of the pantograph linkage is pivotally connected to the shiftable beam 72 as indicated in FIG. 3. A vertically adjustable handle 88 is provided for moving the pantograph linkage in conventional manner for manipulating the parallelogram mechanism. The fine working tool 76 connected in the mount 74 of beam 72 is rotatably driven by an electromotor 90 supported on the cantilever member and which is connected by means of a belt drive mechanism, extending in two swivel arms 92 and 94, to the fine working tool spindle 96 supported in mount 74, and carrying the tool 76.

A dovetail guide 98 is provided, extending externally along one edge of the cantilever member 50, as shown more particularly in FIG. 1, perpendicular to the cantilever guide 48, and a tool slide member 100 having a coacting dovetail guide is disposed in the guide 98 for horizontal guided movement therein. The tool slide 100 carries an electromotor 102 on its end remote from the worktable 26, with the electromotor connected through gearing (not represented) arranged within the interior of the tool slide to rotatably drive the roughing spindle 104 in the tool-spindle holder 101 pivotally connected through flange 103 to spindle holder mount 106 which in turn is pivotally connected through flange 105 to the opposite end of the tool slide member. A handwheel 108, which may be removed when roughing tool-spindle holder 101 and spindle holder mount 106 are disposed in their position of nonuse, as shown in FIGS. 1 and 2, is provided for connection to the spindle holder 101 for axial displacement of the roughing spindle 104 when disposed in its use position, as shown in FIGS. 3–5. In order to be able to lock the tool slide member 100 in any desired horizontal position with respect to cantilever member 50, selectively adjustable locking tommy screws 110 and 112 are provided intermediate the tool slide and cantilever member for locking the same in selected adjustable position with respect to each other.

An arm member 114, shown particularly in FIGS. 3 and 4, is detachably mounted on the cantilever member 50 and is provided with a guide 116 of the dovetail-type or the like, extending in parallel relation to the dovetail guide 98 for tool slide 100. A scanning device 118 is displaceably mounted in guide 116 of arm member 114. This scanning device of conventional design is provided with a feeler member 120 at the lower end thereof which is deflectably mounted in a housing 122. This feeler member 120 controls, by means of a stop mechanism, a light ray falling upon the optical screen 124, the light ray being disposed to be displaced with respect to markings on the screen when the feeler 120 is deflected by contact with the model on the table or clamping plate 42.

When performing the roughing operation on the workpiece, the swivel arm 94 of the fine working spindle device is detached from the top of spindle 96 and from arm 92 as shown in FIGS. 3, 4 and 5, and the pantograph mechanism 82, and with it the parallelogram mechanism 62, 64, 66 and 68 are moved into the nonuse position as shown in FIG. 3. The roughing tool-spindle holder 101 is pivoted 180 degrees on spindle holder mount 106 and spindle holder mount 106 is pivoted 180 degrees on the end of tool slide member 100, about an axis through the center of flange 105, to thus move the roughing tool-holder mechanism 101 and 106 from the position of nonuse shown in FIGS. 1 and 2 to the use position shown in FIGS. 3–5. The roughing tool-spindle holder 101 and spindle holder mount 106 are thus locked in the first operating position, designated at I, in FIG. 5, and the selected roughing tool is inserted in the end of the tool-spindle, designated at 107. The worktable 26 and the model-clamping plate 42 are then horizontally adjusted by means of the handwheel 32 so that the edge of the workpiece disposed on worktable 26 and the corresponding edge of the model disposed on plate 42, relatively facing the cantilever member 50, are respectively positioned under the roughing tool in roughing spindle 104 and under the feeler member 120. The workpiece and the model are then simultaneously horizontally moved by the handwheel 30 along the set line being worked, with the workpiece and the model being vertically moved at the same time by the handwheel 44 so that the light ray spot falling on optical screen 124 of the scanning device remains on the screen within certain prescribed markings. At the end of the particular milled set line, the next line is set in by simultaneously moving the table 26 and plate 42 a desired distance toward the roughing tool holder mechanism. In this manner, line is added to line until the movability of the worktable 26 toward the roughing tool holder mechanism is exhausted with half the table width. The roughing tool-spindle holder 101 and tool slide 100 are then moved into the second operating position, designated at II, in phantom lines, in FIG. 5. The distance between the offset of the operating positions I and II likewise corresponds to half the width of table 26 so that with the roughing spindle 104 disposed in its second operating position, the remaining table surface can pass under the roughing spindle in a line-by-line operation, in like manner to the first described operation, despite the limited movability of the worktable 26.

In the same manner, the working band can be extended in the other horizontal direction parallel to the guide 48 by the movability of the cantilever member 50 along the horizontal guide 48, beyond the movable range of the worktable 26 and the model-clamping plate 42, respectively, in the same direction. It is to be noted that the cantilever member 50 is perpendicularly displaceable with respect to the direction of motion of the tool slide 100.

When the roughing operations on the workpiece are completed the roughing tool-spindle holder 101 and spindle holder mount 106 are each turned 180 degrees into the nonuse position represented in FIGS. 1 and 2, and the tool slide member 100 is shifted rearwardly on the dovetail guide 98 and locked in the nonuse position, represented in FIG. 2, by means of adjustable screws 110 and 112. The arm 114 with the scanning device 118 is removed from the cantilever member 50, and the swivel arm 94 is again attached to arm 92 and the fine working spindle 97 to supply power to the fine working tool 76 supported in the spindle. In this environment the machine is now ready to finish the rough workpiece on table 26 by means of the fine working tool 76. During the fine finishing operation the parallelogram mechanism directing the travel of the tracer point 80 and the fine working tool 76 is manipulated by the pantograph linkage through control handle 88.

While I have described my invention in certain preferred embodiments, I realize that modifications may be made, and I desire that it be understood that no limitations upon my invention are intended other than may be imposed by the scope of the appended claims.

What I claim as new and desire to secure by Letters Patent of the United States is as follows:

1. A duplicating machine comprising a machine stand, a machine part shiftably connected to said stand, a parallelogram mechanism carrying fine working tool means and tracer means connected to said machine part, worktable means and model table means respectively positioned beneath the fine working tool means and tracer means of said parallelogram mechanism and connected for movement relative to said machine stand, said machine part being shiftable longitudinally of said worktable means and said model table means, roughing tool means connected to said machine part for shiftable movement traverse to the path of movement thereof and independent of the movement of said parallelogram mechanism, and said roughing tool means and said fine working tool means each being longitudinally shiftable within the working range thereof overlying said worktable means by said machine part.

2. A duplicating machine as set forth in claim 1, in which said roughing tool means is transversely shiftable into at least two successive use positions overlying said worktable means.

3. A duplicating machine as set forth in claim 2, in which the successive use positions of said roughing tool means in the transverse direction of motion have equal distances from each other.

4. A duplicating machine as set forth in claim 1, in which said machine part is shiftably connected to said stand in one coordinate direction.

5. A duplicating machine as set forth in claim 4, in which said roughing tool means is shiftable in two coordinate directions parallel to the surface of said worktable means, and the working ranges of both said fine working tool means and said roughing tool means are simultaneously enlarged only when said roughing tool means is shifted in one of the two coordinate directions.

6. A duplicating machine as set forth in claim 1, in which said worktable means includes a workpiece clamping surface and in which said roughing tool means is shiftable on said machine part into two successive preselected use positions spaced apart substantially half the width of the workpiece clamping surface.

7. A duplicating machine as set forth in claim 1, in which said roughing tool means is axially displaceable on the machine part carrying the parallelogram mechanism.

8. A duplicating machine as set forth in claim 1, in which said machine part is operably displaceable on said stand in a coordinate direction of movement perpendicular to the direction of said roughing tool means on said machine part.

9. A duplicating machine as set forth in claim 1, and said roughing tool means being longitudinally shiftable relative to said machine part from a nonuse position outside the working range covered by the parallelogram mechanism into a use position overlying said worktable means within the range covered by the parallelogram mechanism for movement through the range by movement of the machine part.

10. A duplicating machine comprising a machine stand, a machine part connected to said stand for longitudinal movement in one coordinate direction, a parallelogram mechanism connected to said machine part and carrying fine working tool means and tracer means, worktable means and model table means positioned beneath and in the working range of said parallelogram mechanism and connected for movement relative to said machine stand, said parallelogram mechanism movable from a use position to a position of nonuse, roughing tool means connected for shiftable movement in another coordinate direction to said machine part independent of said parallelogram mechanism, said roughing tool means being shiftable independent of said machine part in said one coordinate direction from a nonuse position outside the working range covered by the parallelogram mechanism into a use position within the range of the parallelogram mechanism when the latter is moved to its position of nonuse, and model scanning means connected to said machine part above said model table means when said parallelogram mechanism is in its nonuse position for cooperation with said roughing tool means during the roughing operation.

11. A duplicating machine as set forth in claim 10, in which said roughing tool means and said model scanning means are simultaneously movable by said machine part in only said one coordinate direction.

12. A duplicating machine of the type having a roughing tool and a fine working tool comprising, a machine stand, support means connected for horizontal longitudinal movement to said stand, a parallelogram system connected to said support means and carrying fine working tool means and model tracer means, worktable means and model table means connected for movement relative to said machine stand and positioned beneath said parallelogram system in side by side relation longitudinal of the path of movement of said support means, roughing tool means connected to said support means for movement lateral of the worktable means and independent of said parallelogram system, said roughing tool means being longitudinally shiftable relative to said support means from a position outside the working range of the parallelogram system to a position within the working range of said system to perform a roughing operation on a workpiece carried by said worktable means, and said roughing tool means and said parallelogram system each movable longitudinally by said support means to increase the longitudinal working ranges thereof.

References Cited in the file of this patent
UNITED STATES PATENTS

| | | |
|---|---|---|
| 2,572,756 | Plimmer et al. | Oct. 23, 1951 |
| 2,703,510 | Zwick | Mar. 8, 1955 |